(12) United States Patent
Yegenoglu et al.

(10) Patent No.: US 6,459,898 B1
(45) Date of Patent: Oct. 1, 2002

(54) INFORMATION TRAFFIC AND PERFORMANCE MONITORING FOR MULTI-BEAM SATELLITES WITH ON-BOARD SWITCHING

(75) Inventors: Ferit Yegenoglu, Washington, DC (US); Thomas Inukai, Gaithersburg, MD (US)

(73) Assignee: Comsat Corporation, Clarksburg, MD (US)

( * ) Notice: Subject to any disclaimer, the term of this patent is extended or adjusted under 35 U.S.C. 154(b) by 0 days.

(21) Appl. No.: 09/443,465

(22) Filed: Nov. 19, 1999

(51) Int. Cl.[7] .............................................. H04B 7/185
(52) U.S. Cl. .................... 455/427; 455/12.1; 455/67.1; 455/9; 342/352; 370/229; 370/325
(58) Field of Search .................... 455/423–425, 455/427, 428, 430, 12.1, 9, 67.1, 115; 370/229–236, 246, 250, 323, 325; 342/352–354, 357.1, 357.15

(56) References Cited

U.S. PATENT DOCUMENTS 5,530,920 A * 6/1996 Takeda ........................ 455/115
5,664,006 A * 9/1997 Monte et al. ................... 455/9
5,812,538 A * 9/1998 Wiedeman et al. ......... 455/12.1
5,842,125 A * 11/1998 Modzelesky et al. ....... 455/428

* cited by examiner

Primary Examiner—Doris H. To
(74) Attorney, Agent, or Firm—Sughrue Mion, PLLC

(57) ABSTRACT

In a satellite network with on-board switching and bandwidth on demand, traffic monitoring is required to facilitate billing data collection and to avoid congestion at the satellite. In addition to traffic monitoring, performance monitoring is necessary to quickly respond to link degradation or possible equipment anomalies. Monitoring terminals specially equipped with traffic measuring and policing and link performance measuring capabilities are used to monitor traffic and performance. The monitoring terminal is located in each satellite beam to perform the monitoring functions for that beam. The monitoring terminals are low-cost terminals that receive down-link traffic in their respective beam, and record statistics on a per transmit-terminal or per virtual connection basis. Records are periodically transmitted to a central location where they are processed for billing, enforcing traffic contracts, and taking actions against link degradations.

32 Claims, 7 Drawing Sheets

INFORMATION TRAFFIC AND PERFORMANCE MONITORING FOR MULTI-BEAM SATELLITES WITH ON-BOARD SWITCHING

BACKGROUND OF THE INVENTION

1. Field of the Invention

The present invention relates to information traffic and performance monitoring in a multi-beam satellite network with on-board switching.

2. Description of the Related Art

Traffic monitoring is used for gathering usage information for billing, traffic policing to ensure that user traffic does not cause congestion in the network, and collecting statistics for resource planning.

During traffic monitoring for circuit switched traffic, a user terminal (UT) is assigned a fixed radio resource to a fixed destination terminal. Neither the required radio resource nor the destination of the traffic changes throughout the call. The only traffic statistics are the duration of the call, the identity of the origination and destination terminals, and the size of the radio resource assigned to the call. All of this information can be obtained during connection establishment and connection tear down signaling between the UT and a central location such as a Network Control Center (NCC).

During traffic monitoring for packet based traffic, traffic intensity (measured in bits/s or packets/s) may change during the life-time of the connection requiring the NCC to vary the radio resource assigned to the connection to match the demand. When a network accepts such a connection, there is a mutual agreement between the UT and the network. The UT specifies the traffic characteristics for the connection and the network guarantees to provide the quality of service (QoS) required by the connection. This is called a traffic contract. A traffic contract includes the connection's traffic characteristics, the required QoS, and the destination terminal. The traffic characteristics are typically specified in terms of maximum bit rate, average bit rate, and maximum burst length, i.e., the length of the time period during which the terminal transmits at the peak rate. The NCC checks the availability of radio resources, traffic statistics, and required QOS of on-going connections, and decides whether a new call can be accepted into the network. Usually, the new connection will conform to its traffic description.

The amount of radio resources assigned to a connection depends on both the traffic characteristics and the required QoS. Two connections with identical traffic characteristics and different QoS requirements will require a different amount of radio resource. For example, delay tolerant traffic can be assigned a transmission capacity that is very close to the mean bit rate requirement of the connection. Instantaneous periods of high activity can be handled by buffering and temporarily increasing the transmission capacity. On the other hand, delay sensitive traffic would be assigned a transmission capacity equivalent to the peak transmission rate of the connection or very close to it. When additional resources are available, a higher transmission capacity can be assigned to the delay tolerant connection than what is actually needed in order to improve performance.

Even if the transmission capacity assigned to a connection can be higher than the connection's mean traffic rate, it is necessary that the traffic generated by the UT conform to the traffic contract. A UT with an assigned transmission capacity higher than the mean transmission rate specified in the traffic contract can potentially exceed the mean transmission rate and cause congestion in the network. In a satellite network with an on-board packet switch, congestion can occur at a switch output port, thereby degrading the performance of all connections using that output port. Therefore, it is very important that in a satellite system, where the radio resource assigned to a connection is higher than the mean transmission rate specified in the traffic contract, steps are taken to monitor and police the traffic. In addition, In such a network since the transmission capacity assigned to the connection can be larger than what the connection actually uses, billing cannot be based on the assigned capacity alone.

Performance monitoring refers to transmission link performance monitoring. Link degradations can be caused from adverse weather conditions, satellite equipment malfunctioning, and interference. It is important to discover these degradations quickly and take counter measures such as rerouting of traffic or enforcing of transmission power levels.

Conventionally, traffic monitoring can be performed at the UTs or the satellite. Performance monitoring can be performed at the UTs.

When traffic monitoring is performed by the UT, the UT is provided with the capability to collect usage statistics on each connection and send them to the NCC periodically or upon request. The UT must be secured to prevent tampering with the collected statistics.

The capability to perform traffic policing can also be implemented at the UT. The policing unit of the UT is provided with the traffic description of each connection at connection setup. All traffic passes through the policing unit before it is transmitted to the satellite. The policing unit ensures that traffic sent to the satellite conforms to the traffic description by performing traffic shaping or blocking. The policing unit must be secured to prevent tampering.

When traffic monitoring Is performed on the satellite, the on-board processor is provided with the capability to collect usage statistics on each connection and send them to the NCC periodically or upon request.

The up link processors are provided with the capability to police each connection. The policing units of the satellite are provided with each connection's traffic description upon connection setup. All uplink traffic passes through the policing units before entering the on-board switch. The policing units ensure that traffic sent to the satellite from the UTs conforms connection traffic descriptions by performing traffic shaping or blocking.

Each UT monitors the link performance by measuring bit error statistics on down-link transmission. These measurements are sent to the NCC periodically or upon request.

Implementing the monitoring functions at the UTs has three main disadvantages: i) cost and complexity, ii) security, and iii) traffic overhead. First, cost is one of the most important concerns in terminal design especially for consumer terminals. The cost associated with traffic monitoring and performance monitoring can be a significant portion of UT cost. Second, where possible, billing related information should not be collected and stored at the customer equipment due to security concerns. The same concern applies to traffic policing as well. Implementing a totally fraud proof traffic monitoring function can increase the UT cost further. Lastly, there is a communications resource overhead associated with gathering traffic and performance information at each UT and reporting them periodically to the NCC. Centralized monitoring and collective reporting of such data reduces overall communications resource requirements.

The satellite is the ideal place for implementing traffic monitoring functions as this maximizes security and minimizes communications resources associated with reporting of these statistics to the NCC. However, implementing the monitoring functions at the satellite requires capability to collect individual usage statistics and perform individual traffic policing for each connection that the satellite is serving. This increases on-board processing requirements significantly and may not be technically feasible for a large network due to payload mass and power constraints. In addition, centralizing the monitoring functions at the satellite may not be desirable due to reliability considerations. Lastly, transmission link performance monitoring cannot be performed at the satellite and would still need to be implemented on-ground.

SUMMARY OF THE INVENTION

To solve the above problems, it is an object of the present invention to provide an information traffic and performance monitoring system using monitoring functions performed by a number of specially equipped ground terminals, "monitoring terminals" (MT). MTs are low-cost terminals dedicated to performing traffic and performance monitoring and reporting functions. At least one MT is placed at each satellite beam to monitor the traffic of all connections on that down-link beam. The MT also monitors the link performance in that area. Collected statistics are sent to the NCC periodically or upon request.

Accordingly, to achieve the above object, there is provided an information traffic and performance monitoring system for multi-beam satellites with on-board switching containing a satellite for providing communication between a user terminal and a destination user terminal forming a connection. There also is provided a system between MTs and a central location, the system comprising a user terminal for transmitting information to and receiving information from the destination user. terminal and forming a flow of connection with the destination user terminal. There also is at least one MT located in each satellite beam for monitoring the traffic information and the performance of all connections in the satellite beam. Finally, there is a central location for communicating with each of the MTs.

BRIEF DESCRIPTION OF THE DRAWING

The above objective, features and advantages of the present invention will become more apparent by describing in detail a preferred embodiment thereof with reference to the attached drawings in which.

DESCRIPTION OF THE PREFERRED EMBODIMENT

Now, a preferred embodiment according to the present invention will be described with reference to the drawings. The drawings illustrate one embodiment of the present invention.

Figure 1:
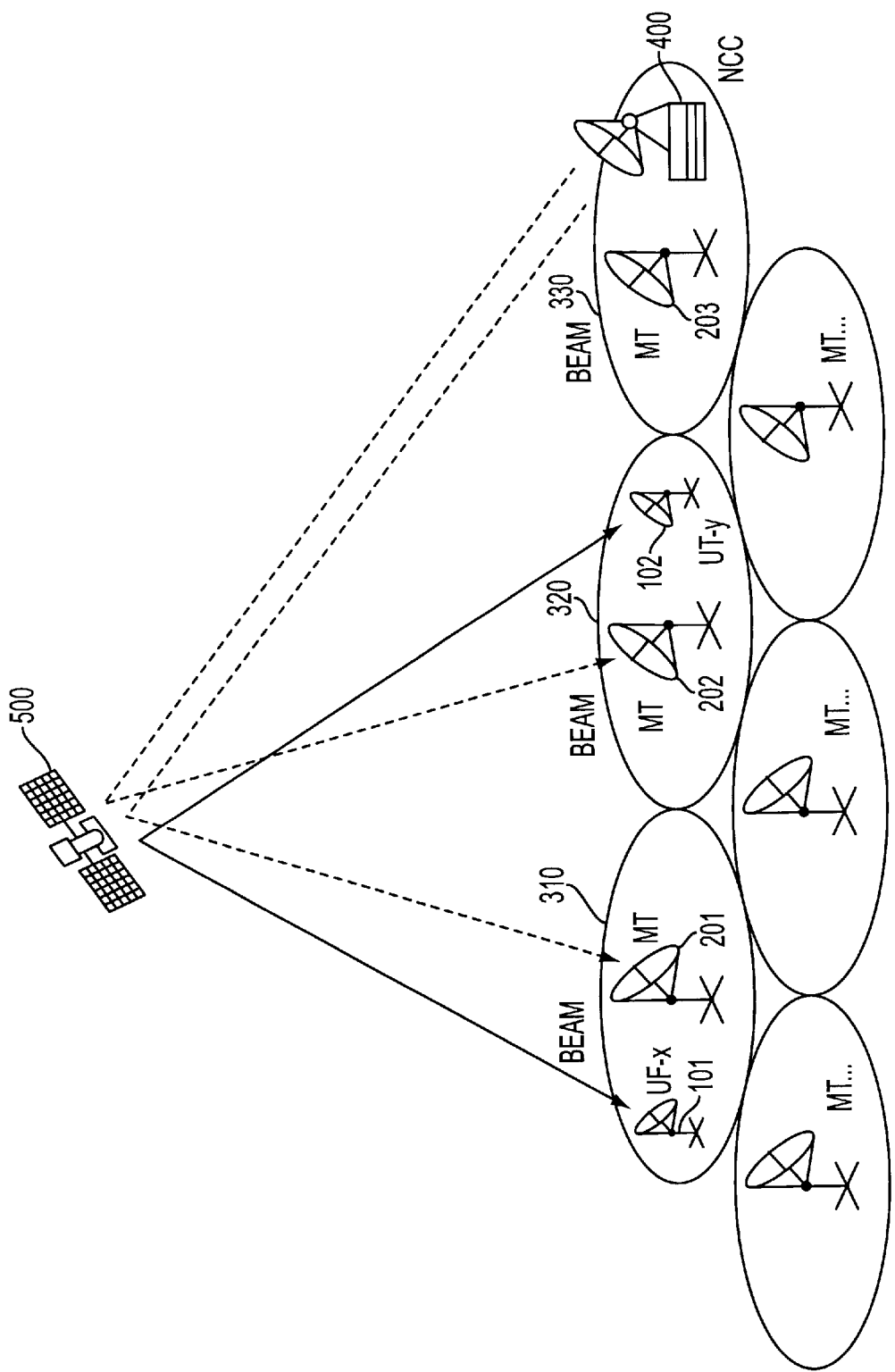
FIG. 1 is an information traffic and performance monitoring system using monitoring terminals according to the present invention.

Referring to FIG. 1, the traffic monitoring function is performed at an end-to-end connection between two user terminals, i.e., a user terminal and a destination user terminal. For simplicity, in FIG. 1, the connection is between UT-x 101 located. in Beam 310 and UT-y 102 located in Beam 320. Monitoring terminals MT 201 and MT 202 are responsible for monitoring all down-link traffic on Beam 310 and Beam 320, respectively. MT 201 is responsible for monitoring the traffic connection UT-y 102 to UT-x 101, and MT 202 is responsible for monitoring the traffic connection UT-x 101 to UT-y 102. At least one MT is located in each satellite beam for monitoring the traffic information and the performance of connections in the satellite beam.

Figure 2:
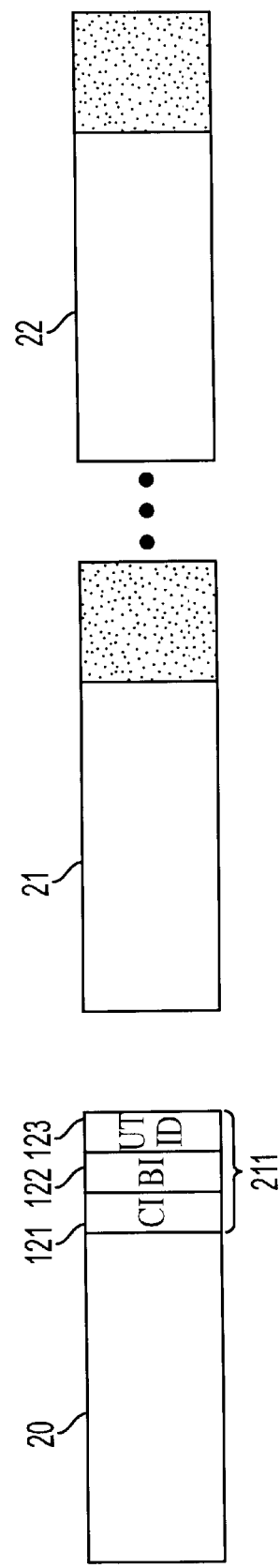
FIG. 2 is a block diagram showing the packets used in the information traffic and performance monitoring system according to the present invention.

In packet-based networks, information is divided into blocks of data known as packets. Packets can be transmitted among endpoint terminals, i.e., between two UTs (UT-UT connection), based on header information which contains appropriate addressing information. Referring to FIG. 2, information is divided into several packets, 20, 21 . . . 22. As illustrated in FIG. 2, each packet includes a header 211. Packet 20 is discussed for simplicity and such discussion applies to each packet. A connection identifier (CI) 121 and a beam identifier (BI) 122 identify each active connection in the packet-based network. The CI 121 and the BI 122 are included in the packet header 211 of each packet transmitted by the user terminal. The packet header 211 may also include a transmit user terminal identification (UT ID) 123 which identifies a name for the connection. The CI 121 identifies what connection each packet belongs to, and the BI 122 identifies the satellite beam of the connection.

The on-board switch switches each packet based on the CI. The destination user terminal identifies the packets that are intended for itself based on the CI. A different CI value may be used in each segment and direction of a connection between two UTs. A MT in a given satellite beam can determine which UT-UT connection a packet belongs to based on the packet's CI value. The CI value to be used on each segment of a satellite connection is determined during connection establishment.

During establishment of the UT-x 101 and UT-y 102 connection, the NCC 400 informs MT 201 and MT 202 of the new connection that they will be monitoring by sending them the CI values and the traffic descriptions. The message that MT 201 receives from the NCC 400 includes the CI value of yx and the traffic contract in the UT-y 102 to UT-x 101 direction of the connection. The message that MT 202 receives from the NCC 400 includes the CI value of xy and the traffic contract in the UT-x 101 to UT-y 102 direction of the connection. MT 201 and MT 202 use the CI values of yx and xy, respectively, for monitoring the connection's traffic.

Figure 3:
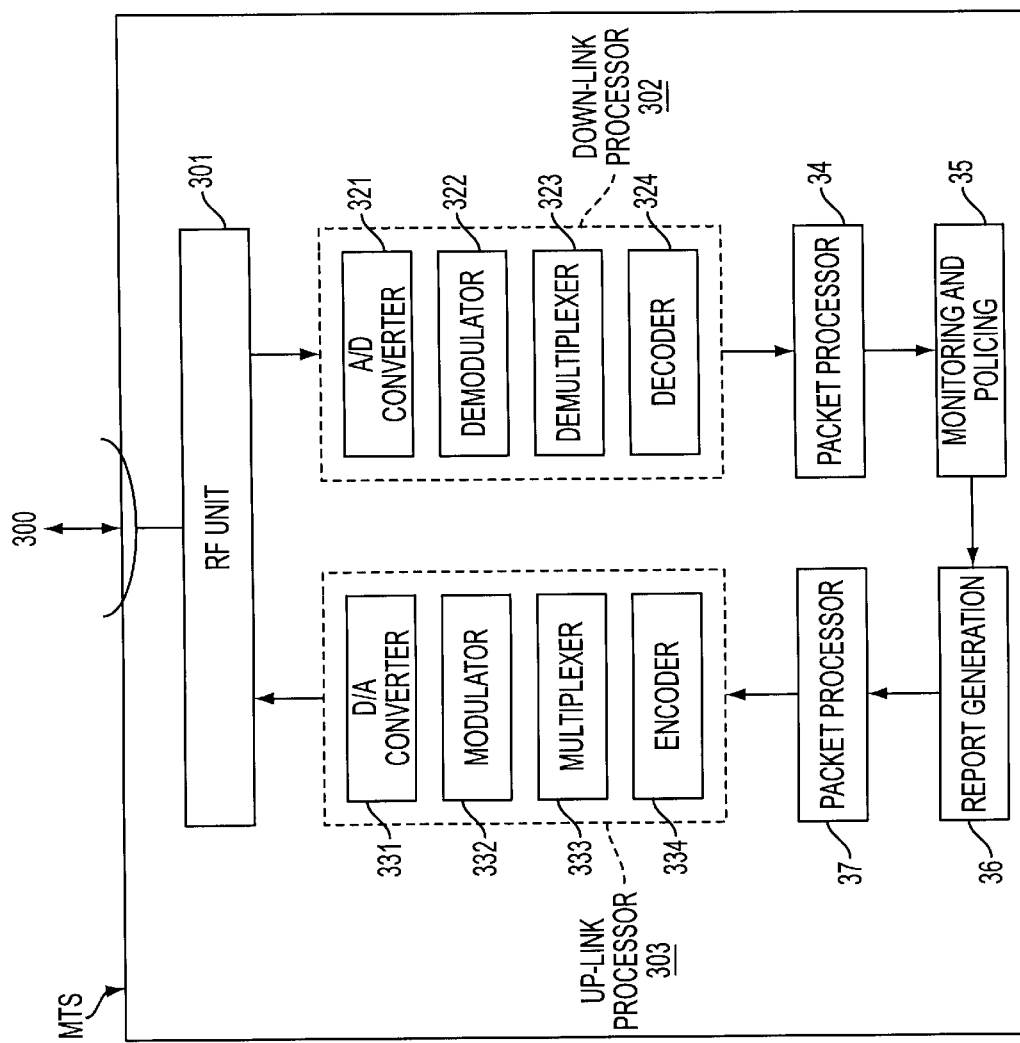
FIG. 3 is a block diagram of the monitoring terminals in the information traffic and performance monitoring system according to the present invention.

A description of the MTs will be described with reference to FIG. 3. FIG. 3 is a block diagram showing an embodiment of the internal construction of the MTs. Each MT has both a down-link processor 302 and an up-link processor 303. The down-link processor 302 contains an analog-to-digital (A/D) converter 321, a demodulator 322, a demultiplexer 323, and a decoder 324. The up-link processor 303 contains a digital-to-analog (D/A) converter 331, a modulator 332, a multiplexer 333, and an encoder 334. The MT 201 and MT 202 receive messages from the NCC 400 through RF unit 301. Each MT is responsible for monitoring all down-link traffic in their respective beam.

The received signal is passed through A/D converter 321 and the resulting signal is demodulated in demodulator 322. The output of the demodulator 322 is demultiplexed by demultiplexer 323 and the demultiplexed signal is decoded in decoder 324. The packet processor 34 identifies which direction of the UT-UT connection that the MT will monitor based on the packet's CI: value. The MT uses the CI value of the direction for monitoring the connection's traffic. After the packet processor 34 determines which direction the MT will monitor, the monitoring and policing unit 35 starts a new counter and a new policer. After the monitoring and policing unit 35 performs the monitoring and traffic policing functions, the report generation unit 36 collects and generates a report of the outcome of the monitoring and traffic policing functions to be transmitted to the NCC 400. The information of the report generation unit 36 is sent to the packet processor 37. The encoder 334 encodes the information of packet processor 37 and the encoded signal is multiplexed by multiplexer 333. The multiplexed signal is modulated by modulator 332 and the modulated signal is passed through D/A converter 331. The NCC 400 receives the converted information of the monitoring and traffic policing functions through RF unit 301.

Figure 4:
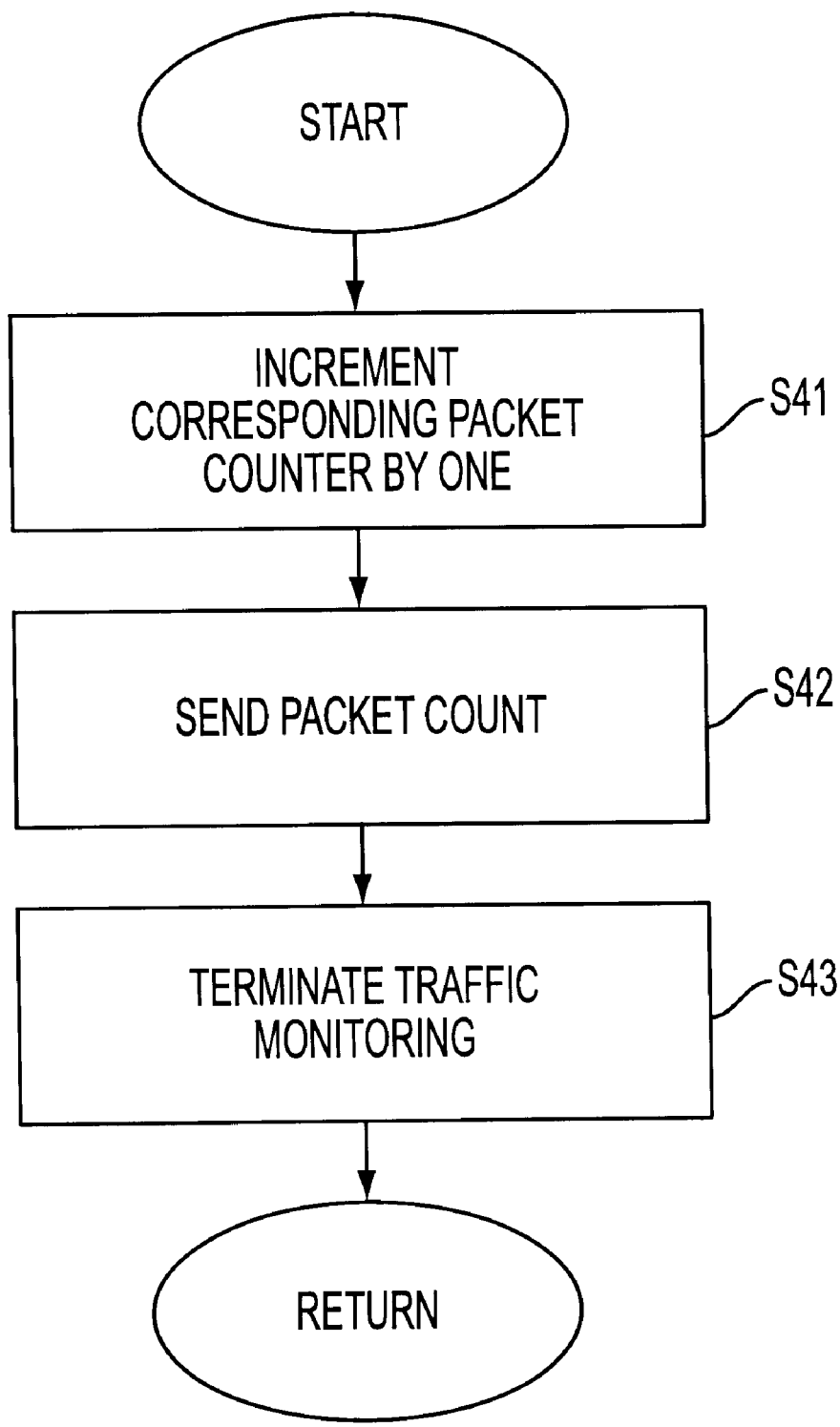
FIG. 4 is a flowchart showing the counting function of the monitoring terminal of FIG. 3.

The monitoring and policing unit 35 of the MT in FIG. 3 performs counting, traffic policing, and performance monitoring functions. FIG. 4 is a flowchart showing the counting function of the monitoring and policing unit 35. In the counting procedure, the MTs increment the corresponding packet counter by one for each packet that it receives at step S41. When each connection is terminated, the NCC sends a message to the corresponding MT requesting the total packet count in each direction of the connection. The MTs respond with the packet count at step S42 and terminate traffic monitoring for that connection at step S43.

Figure 5:
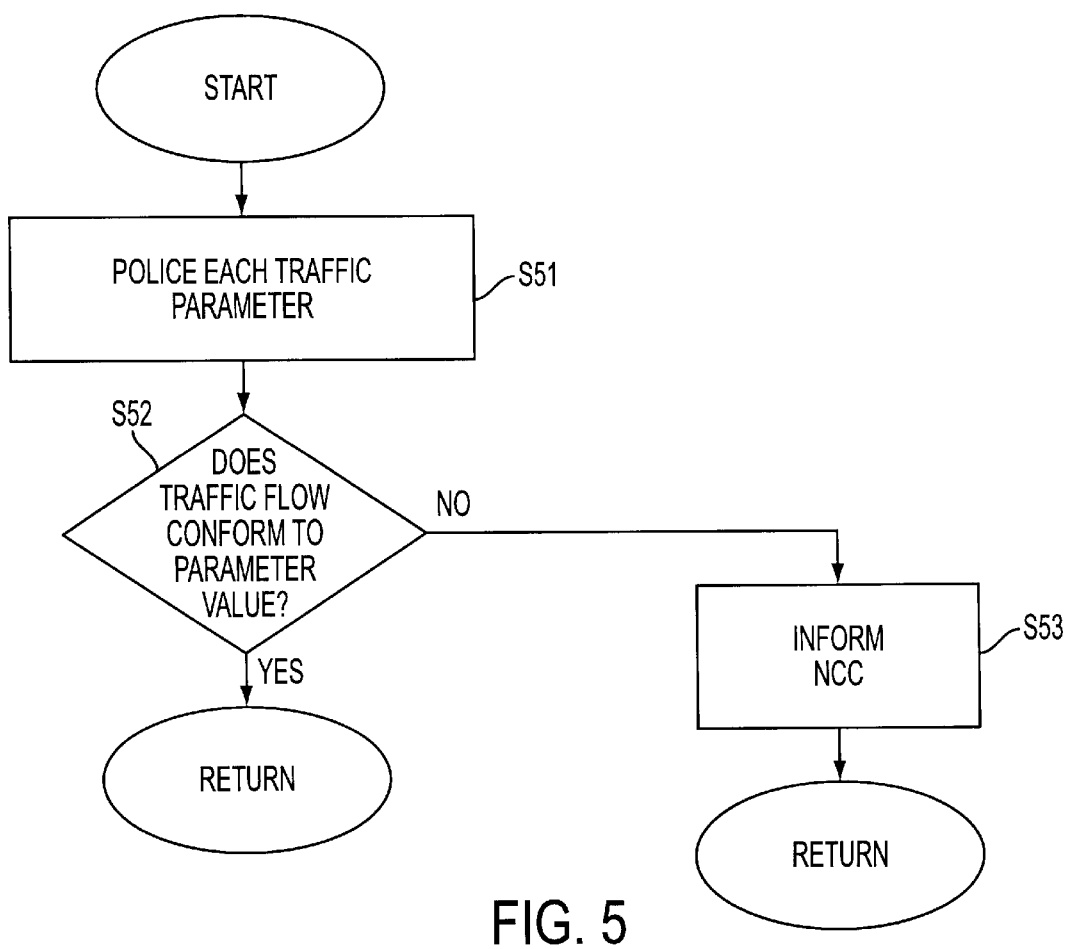
FIG. 5 is a flowchart showing the traffic policing function of the monitoring terminal of FIG. 3.

Traffic policing is slightly more complicated and may require interaction between the MT and the NCC throughout the lifetime of a connection. FIG. 5 Is a flowchart showing the traffic policing function of the monitoring and policing unit 35 of the MT in FIG. 3. The MT polices each traffic parameter that was included in the traffic contract at step S51. These may include the peak transmission rate, average transmission rate, and maximum burst size. The MT uses specific algorithms to check whether the traffic flow of the connection conforms to the parameter values specified in the call setup for each connection at step S52. If the flow on a connection is consistently violating the traffic contract, the MT informs the NCC 400 of this violation at step S53. The NCC 400 takes necessary actions to enforce the traffic contract. These may include reducing the radio resources assigned to the connection or even forcing termination of the connection depending on the utilization of the network. These violations may also be reflected In billing. If the MT consistently receives packets with a Cl value for which no connection record exists in the MT, the MT informs the NCC 400. This may be due to an UT transmitting packets to a different destination UT than the one specified in the traffic contract.

Figure 6:
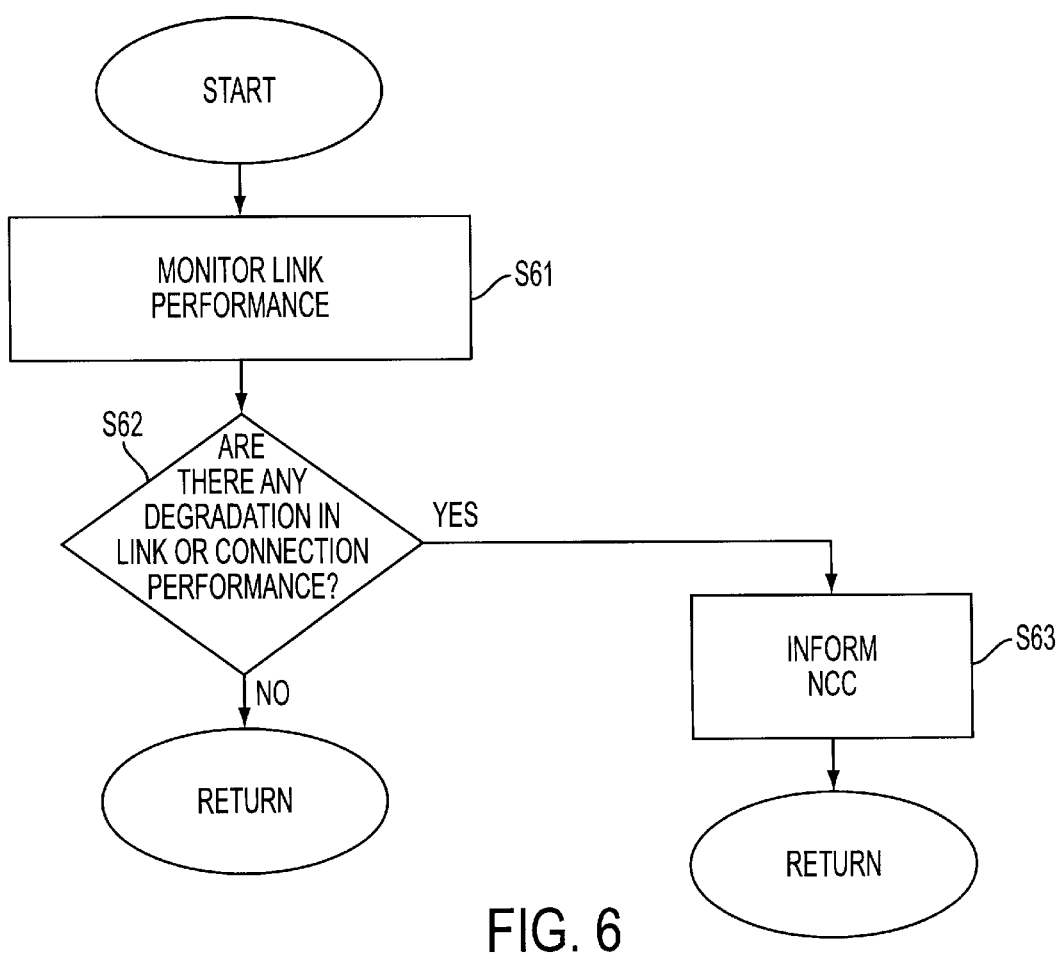
FIG. 6 is a flowchart showing the performance monitoring function of the monitoring terminal of FIG. 3.

The MT is also equipped with performance monitoring capability. FIG. 6 is a flowchart showing the performance monitoring function of the monitoring and policing unit 35 of the MT in FIG. 3. The MT monitors link performance based on a bit error rate or a signal strength measurement on the down-link transmission at step S61. The MT may also monitor bit error rate performance on, a per connection basis. It is not expected that the MT will monitor the bit error rate performance of all connections individually at all times. This may be performed on some connections upon request from the NCC 400 for fault isolation. The MT informs the NCC 400 at step S63 of any degradation in link or connection performance found at step S62.

Figure 7:
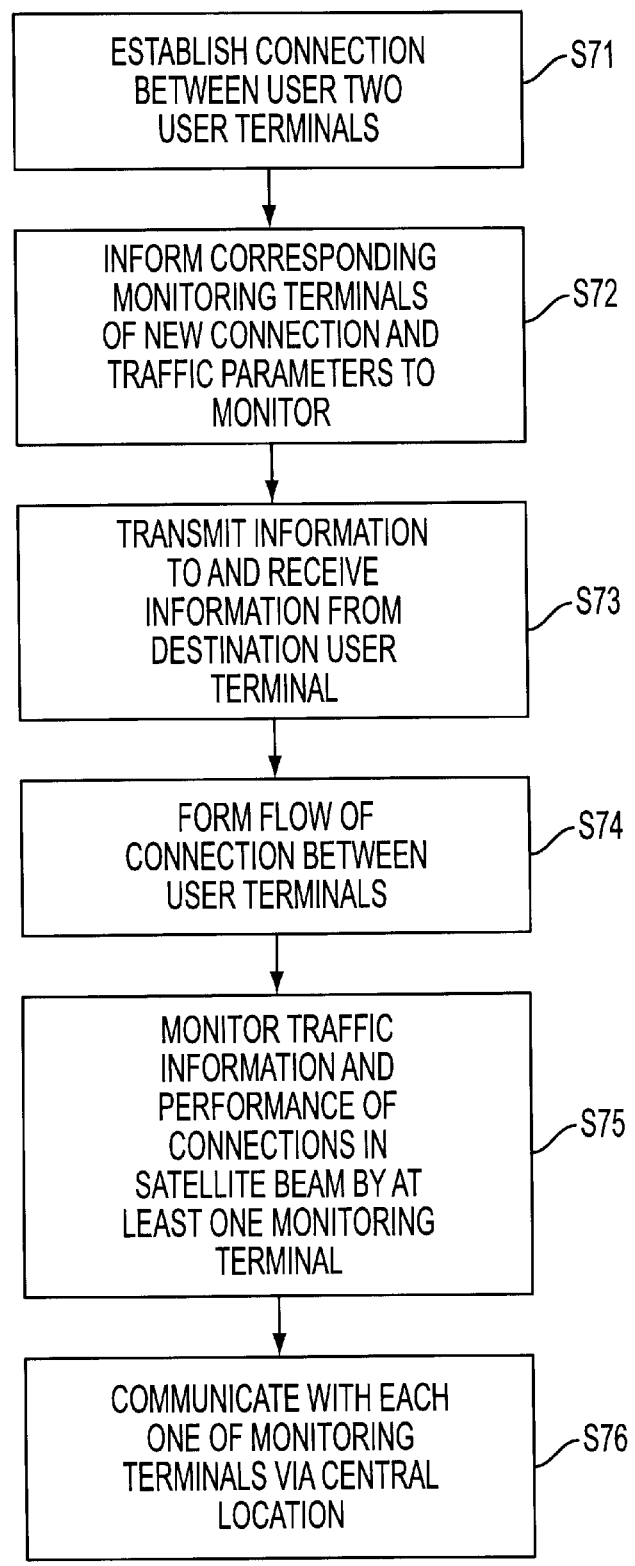
FIG. 7 is an information traffic and performance monitoring method using monitoring terminals according to the present invention.

FIG. 7 is an information traffic and performance monitoring method using the MTs according to the present invention. In step S71, a connection is established between two UTs, i.e., a user terminal and a destination user terminal. A corresponding MT is informed of the new connection and traffic parameters that it will be monitoring in step 372. In step 373, information is transmitted to and received from the destination user terminal. A flow of connection is formed between the user terminal and the destination user terminal in step S74. The traffic information and the performance of connections in the satellite beam are monitored. by at least one of the MTs in step S75. Finally, in step S76, each of the MTs communicate with the NCC 400 and reports to the NCC 400 the monitoring and policing information from its respective satellite beam.

Eliminating the monitoring functions from the UTs will reduce the terminal cost and complexity significantly. Similarly, not implementing these monitoring functions on the satellite will reduce onboard processing requirements significantly. Implementing the monitoring functions on the MTs instead of UTs or the satellites provides flexibility for future modifications to traffic policing parameters and algorithms. In addition, separating these functions from the UTs also eliminates potential fraud.

Having described the invention in detail and by reference to the drawings, it will be apparent that modification and variations are. possible without departing from the scope of the invention. Therefore, it is intended that the invention not be limited by the precise structure shown and described, but rather the full scope of the invention as defined in the following claims.

What is claimed is:

1. An information traffic and performance monitoring system for multi-beam satellites with on-board switching containing a satellite for providing a communication between a source user terminal and at least one destination user terminal forming an active connection, and between monitoring terminals and a central location, the system comprising:

said source user terminal located in a satellite beam for transmitting information to and receiving information from said at least one destination user terminal and providing an active connection with said at least one destination user terminal;

at least one said monitoring terminal located in each said satellite beam for monitoring the traffic information and the performance of active connections in said satellite beam; and said central location for communicating with each of said monitoring terminals.

2. The system of claim 1, wherein said central location informs said monitoring terminal of a new connection that said monitoring terminal will monitor.

3. The system of claim 1, wherein said monitoring terminal monitors the link performance in said satellite beam.

4. The system of claim 3, wherein said link performance monitoring is based on a signal strength measurement.

5. The system of claim 3, wherein said link performance monitoring is based on a signal strength measurement.

6. The system of claim 1, wherein said monitoring terminal sends collected traffic date to said central location.

7. The system of claim 1, wherein said monitoring terminal performs a counting function.

8. The system for claim 1, wherein said monitoring terminal performs a traffic policing function.

9. An information traffic and performance monitoring system for multi-beam satellites with on-board switching containing a satellite for providing a communication between a source user terminal and a destination user terminal forming an active connection, and between monitoring terminals and a central location, the system comprising:

said source user terminal located in a satellite beam for transmitting information to and receiving information from said destination user terminal and forming a flow of connection with said destination user terminal;

at least one said monitoring terminal located in each said satellite beam for monitoring the traffic information and the performance of active connections in said satellite beam; and said central location for communicating with each of said monitoring terminals, wherein a connection identifier and a beam identifier identifies each active connection.

10. The system of claim 2, wherein said connection identifier is determined during connection establishment.

11. The system of claim 2, wherein said connection identifier is included in a packet header of each packet transmitted by said user terminal.

12. The system of claim 11, wherein said destination user terminal identifies said packets that are intended for said destination user terminal based on said connection identifier.

13. The system of claim 11, wherein said monitoring terminal determines which said connection said packet belongs to based on said connection identifier.

14. The system of claim 9, wherein said central location sends said monitoring terminal said connection identifier and a traffic description.

15. The system of claim 14, wherein said traffic description includes a peak transmission rate, an average transmission rate, or a maximum burst size.

16. The system of claim 14, wherein said monitoring terminal starts a new counter and new policer for a direction said monitoring terminal will monitor after receiving said connection identifier and said traffic description.

17. An information traffic and performance monitoring method for multi-beam satellites with on board switching containing a satellite for providing communication between a source user terminal and a at least one destination user terminal forming an active connection, and between monitoring terminals and a central location, comprising the steps of:

establishing said active connection between said user terminal and said at least one destination user terminal;

informing the corresponding monitoring terminal of the new active connection and traffic parameters to monitor;

transmitting information to and receiving information from said at least one destination user terminal;

forming an active connection between said user terminal with said at least one destination user terminal;

monitoring the traffic information and the performance of active connections in said satellite beam by at least one said monitoring terminal located in each said satellite beam; and communicating with each of said monitoring terminals via said central location.

18. The method of claim 17, wherein said central location informs said monitoring terminal of a new connection that said monitoring terminal will monitor.

19. The method of claim 17, wherein said monitoring terminal monitors the link performance in said satellite beam.

20. The method of claim 19, wherein said link performance monitoring is based on a bit error rate.

21. The method of claim 19, wherein said link performance monitoring is based on a signal strength measurement.

22. The method of claim 17, wherein said monitoring terminal sends collected traffic data to said central location.

23. The method of claim 17, wherein said monitoring terminal performs a counting function.

24. The method of claim 17, wherein said monitoring terminal performs a traffic policing function.

25. An information traffic and performance monitoring method for multi-beam satellites with on board switching containing a satellite for providing communication between a user terminal and a destination user terminal forming a connection, and between monitoring terminals and a central location, comprising the steps of:

establishing said connection between said user terminal and said destination user terminal;

informing the corresponding monitoring terminal of the new connection and traffic parameters to monitor, transmitting information to and receiving information from said destination user terminal; forming a flow of connection between said user terminal with said destination user terminal;

monitoring the traffic information and the performance of connections in said satellite beam by at least one said monitoring terminal located in each said satellite beam; and communicating with each of said monitoring terminals via said central location, wherein a connection identifier and a beam identifier identifies each active connection.

26. The method of claim 23, wherein said connection identifier is determined during connection establishment.

27. The method of claim 23, wherein said connection identifier is included in a packet header of each packet transmitted by said user terminal.

28. The method of claim 27, wherein said destination user terminal identifies said packets that are intended for said user terminal based on said connection identifier.

29. The method of claim 27, wherein said monitoring terminal determines which said connection said packet belongs to based on said connection identifier.

30. The method of claim 23, wherein said central location sends said monitoring terminal said connection Identifier and a traffic description.

31. The method of claim 30, wherein said traffic description includes a peak transmission rate, an average transmission rate, or a maximum burst size.

32. The method of claim 30, wherein said monitoring terminal starts a new counter and new policer for a direction said monitoring terminal will monitor after receiving said connection identifier and said traffic description.

* * * * *